(12) United States Patent
Yamazaki et al.

(10) Patent No.: US 7,107,484 B2
(45) Date of Patent: Sep. 12, 2006

(54) FAULT-TOLERANT COMPUTER SYSTEM, RE-SYNCHRONIZATION METHOD THEREOF AND RE-SYNCHRONIZATION PROGRAM THEREOF

(75) Inventors: Shigeo Yamazaki, Tokyo (JP); Shigeyuki Aino, Tokyo (JP)

(73) Assignee: NEC Corporation, Tokyo (JP)

( * ) Notice: Subject to any disclaimer, the term of this patent is extended or adjusted under 35 U.S.C. 154(b) by 486 days.

(21) Appl. No.: 10/614,150

(22) Filed: Jul. 8, 2003

(65) Prior Publication Data

US 2004/0153857 A1 Aug. 5, 2004

(30) Foreign Application Priority Data

Jul. 12, 2002 (JP) ............................. 2002-204167

(51) Int. Cl.
*G06F 13/00* (2006.01)
(52) U.S. Cl. ........................................ 714/12; 714/34
(58) Field of Classification Search ............... 714/12, 714/34
See application file for complete search history.

(56) References Cited

U.S. PATENT DOCUMENTS

| | | | |
|---|---|---|---|
| 5,020,024 A | 5/1991 | Williams | |
| 5,353,436 A | 10/1994 | Horst | |
| 5,896,523 A | 4/1999 | Bissett et al. | |
| 6,065,135 A * | 5/2000 | Marshall et al. | 714/11 |
| 6,289,022 B1 * | 9/2001 | Gale et al. | 370/412 |
| 6,473,869 B1 * | 10/2002 | Bissett et al. | 714/12 |
| 6,629,062 B1 * | 9/2003 | Coffey et al. | 702/188 |
| 6,779,128 B1 * | 8/2004 | Gale et al. | 714/6 |
| 2002/0010880 A1 * | 1/2002 | Williams | 714/43 |
| 2003/0163769 A1 * | 8/2003 | Phelps | 714/43 |
| 2003/0188222 A1 * | 10/2003 | Abbondanzio et al. | 714/12 |
| 2003/0208704 A1 * | 11/2003 | Bartels et al. | 714/11 |
| 2004/0153731 A1 * | 8/2004 | Aino et al. | 714/6 |
| 2006/0041785 A1 * | 2/2006 | Shimawaki | 714/12 |

FOREIGN PATENT DOCUMENTS

| | | |
|---|---|---|
| DE | 41 04 114 A1 | 8/1992 |
| EP | 0 104 490 A2 | 4/1984 |
| EP | 0 974 912 A2 | 1/2000 |
| JP | 4-247531 | 9/1992 |
| JP | 10-326199 | 12/1998 |
| JP | 2002-49501 | 2/2002 |

* cited by examiner

*Primary Examiner*—Scott Baderman
*Assistant Examiner*—Loan Truong
(74) *Attorney, Agent, or Firm*—Sughrue Mion, PLLC

(57) ABSTRACT

In a lock-step synchronism fault-tolerant computer system including a plurality of computing modules having a processor and a memory in which each computing module processes the same instruction string in synchronization with each other. When detecting disagreement in a state of access to an external bus among the respective processors in each computing module, if no fault is detected in the system including each computing module, processing of resuming operation in synchronization is executed with respect to each computing module after generating an interruption to all the processors to execute delay adjustment for making a state of instruction execution among computing modules be coincident.

22 Claims, 10 Drawing Sheets

FAULT-TOLERANT COMPUTER SYSTEM, RE-SYNCHRONIZATION METHOD THEREOF AND RE-SYNCHRONIZATION PROGRAM THEREOF

BACKGROUND OF THE INVENTION

1. Field of the Invention

The present invention relates to a lock-step synchronism fault-tolerant computer system which processes the same instruction string in a totally the same manner by a plurality of computing modules in clock synchronization with each other. More particularly, it relates to a fault-tolerant computer system and a high-speed re-synchronization controlling method which realize speed-up of re-synchronization processing when a synchronism fault among computing modules occurs (lock-step comes off).

2. Description of the Related Art

With a conventional lock-step synchronism fault-tolerant computer system, when among a plurality of computing modules executing the same instruction string at the same time, a computing module is detected having a different output from that of other computing modules due to a failure or other external or internal factor, such countermeasures as follows are taken. In the following, a computing module detected failing to operate in synchronization with other computing modules will be referred to as a computing module in a step-out state.

More specifically, such a measure is taken of once cutting off a computing module whose lock-step comes off from an operational state and replacing the computing module as required according to a factor causing step-out or when replacement is not necessary, conducting re-initialization processing or the like according to the necessity to integrate the computing module into the operational state.

At the time of the above-described re-integration into the operational state in conventional lock-step synchronism fault-tolerant computer system, because irrespectively whether a computing module at the step-out state has been replaced or not, for the computing module to synchronize with other computing modules continuing with operation to execute the same processing again, all the memory data held by the computing modules at the operational state are copied into a memory held by the computing module which is to be re-integrated at the time of its re-integration.

In conventional lock-step synchronism fault-tolerant computer system, after executing replacement of a computing module at the step-out state, re-initialization processing according to a part causing step-out and the like, when integrating the computing module in question into the operational state again, computing modules at the operational state are halted for a long period of time.

More specifically, the conventional lock-step synchronism fault-tolerant computer system has a problem that while a computing module at the step-out state is subjected to re-integration processing, the entire fault-tolerant computer system has its operation halted for a long period of time (3 to 5 seconds in general or on the order of minutes).

The reason is that in order to integrate a computing module at the step-out state into the operational state, all the memory contents are copied all the time from the computing modules continuing with operation into the computing module to be re-integrated.

When operation of a normal computing module is continued during the copying processing, memory contents of the normal computing module have a possibility to be changed during the copying processing as well, so that copying can not be performed properly. For avoiding such a situation, a computing module at the operational state is temporarily stopped to prevent updating of its memory contents.

Since a memory capacity in a computing module today comes up to several Giga bytes, copying the entire memory region will require a long period of time.

In a lock-step synchronism fault-tolerant computer system, a step-out state among computing modules occurs due to various causes.

First case is a fixed failure occurring within a computing module. In this case, a computing module having a failure should be replaced and when integrating the computing module to be replaced into an operational system, all the data in a memory of a computing module at the operational state needs to be copied.

In a lock-step synchronism fault-tolerant computer system, a step-out state may occur because, in addition to the above-described fixed failure, computing modules operate at different timing due to difference in manufacturing of each unit in a computing module although its operation is normal or because of an automatically correctable intermittent failure of memory caused by effects of $\alpha$-ray or the like.

In these cases, since a fixed failure occurs not in a computing module itself, the module fundamentally needs no replacement, and by again synchronizing its processing with that of other computing modules in operation to integrate the computing module in question, the entire fault-tolerant computer system can be restored to a normal operation state.

SUMMARY OF THE INVENTION

An object of the present invention is to provide a fault-tolerant computer system, a re-synchronization method thereof and a re-synchronization program thereof which enable a computing module whose lock-step comes off due to other causes than a fixed failure to be integrated again into the operational state at a higher speed than by a conventional system, thereby drastically reducing time of temporary halt of the system operation caused by the integration processing.

Another object of the present invention is to provide a fault-tolerant computer system, a re-synchronization method thereof and a re-synchronization program thereof which realize improvement of availability of the system by the reduction of time for the above-described re-integration processing.

According to the first aspect of the invention, a lock-step synchronism fault-tolerant computer system including a plurality of computing modules having a processor and a memory in which each computing module processes the same instruction string in synchronization with each other, wherein when detecting disagreement in a state of access to an external bus among the processors in each the computing module, if no fault is detected in the system including each the computing module, processing of resuming operation in synchronization is executed with respect to each the computing module after generating an interruption to all of the processors to execute delay adjustment for making a state of instruction execution among the computing modules be coincident.

In the preferred construction, the fault-tolerant computer system further comprises a fault detector which monitors existence/non-existence of a fault in the system;

a bus monitor which monitors a state of access of each the processor in each the computing module to the external bus;

interruption control means for, in a case where the bus monitor detects lack of synchronization in a state of access of each the processor in each the computing module to the external bus, when the fault detector detects no fault, generating an interruption for notifying the detection result to each the processor;

inter-system communication control means connected to each the computing module for notifying a state of instruction execution among the processors in each the computing module, and synchronization control means connected to each the computing module for generating a reset signal for resuming operation of all the computing modules in synchronization after conducing delay adjustment for making a state of instruction execution in each the computing module be coincident.

In another preferred construction, each of all the processors includes an instructions number counter for counting the number of executed instructions in the processor, the instructions number counter fails to operate when the processors receive an interruption from the interruption control means and shift to a processor management mode for re-synchronization;

each the processor compares a value of its own instructions number counter with a value of instructions number counter received from each corresponding processor in other computing modules;

the computing module, which does not include the instructions number counter indicating the largest value among all of the counters, conducts delay adjustment of executing instructions until the instructions number counter value coincides with the largest instructions number counter value and when the values coincide, sends a notification to the computing module which includes the instructions number counter indicating the largest value, and the computing module, which includes the instructions number counter indicating the largest value, waits for receiving a notification from all the other computing modules and when receiving all the notifications, instructs the synchronization control means to generate a reset signal for causing all the computing modules to resume operation in synchronization with each other.

In another preferred construction, in delay adjustment in which the computing module whose the instructions number counter value is not the largest executes instructions until the instructions number counter value coincides with the largest instructions number counter value, the processor is set at a step execution mode for shifting to the processor management mode after executing one instruction, and the processor repeats the processing of the step execution mode until the instructions number counter value coincides with the largest instructions number counter value.

In another preferred construction, each of all the processors received an interruption from the interruption control means shifts to a processor management mode for re-synchronization processing in which an instructions number counter for counting the number of executed instructions in the processor fails to operate and a program counter value is saved and stored;

each the processor reads an instructions number counter value of each processor and the saved program counter value and transmits the values to all other the computing modules;

each the processor compares the instructions number counter value with an instructions number counter value received from each processor in other computing modules;

the computing module whose the instructions number counter value is not the largest conducts delay adjustment of executing instructions until the instructions number counter value coincides with the largest instructions number counter value and when the values coincide, sends a notification to the computing module which includes the instructions number counter indicating the largest value, and the computing module which includes the instructions number counter indicating the largest value waits for receiving a notification from all the other computing modules receiving a notification from all the other computing modules and when receiving all the notifications, instructs the synchronization control means to generate a reset signal for causing all the computing modules to resume operation in synchronization with each other.

In another preferred construction, in delay adjustment in which the computing module whose the instructions number counter value is not the largest executes instructions until the instructions number counter value coincides with the largest instructions number counter value, the processor is set at a break point designation execution mode for shifting to the processor management mode after executing up to an instruction at a specific position in a designated instruction string;

as the specific position in the instruction string, an instruction position indicated by the program counter value received from the computing module which includes the instructions number counter indicating the largest is designated to, and after executing the instruction string up to the specific position in a designated instruction string the processor is shifted to the processor management mode.

In another preferred construction, after reading a program execution state, the computing module, which includes the instructions number counter indicating the largest, waits for the notification from other computing modules;

after executing the delay adjustment processing, all the other computing modules, which does not include the instructions number counter indicating the largest value, read a program execution state and transmit the program execution state together with a notification of completion of the delay adjustment processing to the computing module which includes the instructions number counter indicating the largest, and the computing module which includes the instructions number counter indicating the largest compares program execution states of all the computing modules and when all coincide with each other, instructs on generation of the reset signal for resuming synchronization operation and when a computing module whose program execution state is not coincident is detected, instructs on the generation of the reset signal for resuming operation in synchronization after executing processing of cutting off and invalidating the computing module.

In another preferred construction, a plurality of pairs of the fault detector, the bus monitor, the interruption control means, the inter-system communication control means and the synchronization control means are provided.

According to another aspect of the invention, a re-synchronization method in a lock-step system fault-tolerant computer system including a plurality of computing modules having a processor and a memory in which each computing module processes the same instruction string in synchronization with each other, comprising the steps of when detecting disagreement in a state of access to an external bus among the processors in each the computing module, if no fault is detected in the system including each the computing module, generating an interruption to all of the processors, and after executing delay adjustment for making an instruction execution state be coincident among the computing modules, executing processing of resuming operation in synchronization with respect to each the computing module.

In the preferred construction, the re-synchronization method of a fault-tolerant computer system further comprises the steps of monitoring existence/non-existence of a fault in the system;

monitoring a state of access of each the processor in each the computing module to the external bus;

when detecting disagreement in a state of access of each the processor in each the computing module to the external bus, if no fault is detected, generating an interruption for notifying the detection result to all of the processors, and after executing the delay adjustment for making a state of instruction execution be coincident among the computing modules, generating a reset signal for executing processing of resuming operation in synchronization of all the computing modules.

In another preferred construction, the re-synchronization method further comprises the steps of each of all the processors received the interruption shifting to a processor management mode for re-synchronization processing in which an instructions number counter for counting the number of executed instructions in the processor fails to operate;

each the processor comparing the read instructions number counter value with an instructions number counter value received from each processor in other computing modules;

the computing module, which does not include the instructions number counter indicating the largest value among all of the counters, executing the delay adjustment of executing instructions until the instructions number counter value coincides with the largest instructions number counter value and when the values coincide, sending a notification to the computing module which includes the instructions number counter indicating the largest value, and the computing module, which includes the instructions number counter indicating the largest value, waiting for receiving a notification from all the other computing modules and when receiving all the notifications, generating the reset signal for causing all the computing modules to resume operation in synchronization with each other.

In another preferred construction, in the delay adjustment in which the computing module whose the instructions number counter value is not the largest executes instructions until the instructions number counter value coincides with the largest instructions number counter value;

the processor is set at a step execution mode for shifting to the processor management mode after executing one instruction, and the processor repeats the processing of the step execution mode until the instructions number counter value coincides with the largest instructions number counter value.

In another preferred construction, each of all the processors received the interruption shifts to a processor management mode for re-synchronization processing in which an instructions number counter for counting the number of executed instructions in the processor fails to operate and a program counter value is saved and stored;

each the processor reads the instructions number counter value of each processor and the saved program counter value and transmits the values to all other the computing modules;

each the processor compares the instructions number counter value with an instructions number counter value received from each processor in other computing modules;

the computing module whose the instructions number counter value is not the largest executes the delay adjustment of executing instructions until the instructions number counter value coincides with the largest instructions number counter value and when the values coincide, sends a notification to the computing module which includes the instructions number counter indicating the largest value, and the computing module which includes the instructions number counter indicating the largest value waits for receiving a notification from all the other computing modules and when receiving all the notifications, generates the reset signal for causing all the computing modules to resume operation in synchronization with each other.

In another preferred construction, in delay adjustment in which the computing module whose the instructions number counter value is not the largest executes instructions until the instructions number counter value coincides with the largest instructions number counter value;

the processor is set at a break point designation execution mode for shifting to the processor management mode after executing up to an instruction at a specific position in a designated instruction string;

as the specific position in the instruction string, an instruction position indicated by the program counter value received from the computing module which includes the instructions number counter indicating the largest is designated to, and after executing the instruction string up to the specific position in a designated instruction string the processor is shifted to the processor management mode.

In another preferred construction, after reading a program execution state, the computing module, which includes the instructions number counter indicating the largest, waits for the notification from other computing modules;

after executing the delay adjustment processing, all the other computing modules, which does not include the instructions number counter indicating the largest value, read a program execution state and transmit the program execution state together with a notification of completion of the delay adjustment processing to the computing module which includes the instructions number counter indicating the largest, and the computing module which includes the instructions number counter indicating the largest compares program execution states of all the computing modules and when all coincide with each other, instructs on generation of the reset signal for resuming synchronization operation and when a computing module whose program execution state is not coincident is detected, instructs on the generation of the reset signal for resuming operation in synchronization after executing processing of cutting off and invalidating the computing module.

According to another aspect of the invention, a re-synchronization program for executing re-synchronization processing of a lock-step synchronism fault-tolerant computer system including a plurality of computing modules having a processor and a memory in which each computing module processes the same instruction string in clock synchronization with each other, comprising the functions of when detecting disagreement in a state of access to an external bus among the processors in each the computing module, if no fault is detected in the system including each the computing module, generating an interruption to all of the processors, and causing each the processor to resume operation in synchronization after executing delay adjustment for making an instruction execution state be coincident among the computing modules.

In the preferred construction, the re-synchronization program further comprises the functions of monitoring existence/non-existence of a fault in the system;

monitoring a state of access of each processor in each the computing module to the external bus, when detecting disagreement in a state of access of each the processor in each the computing module to the external bus, if no fault is detected in the fault monitoring, generating an interruption for notifying the detection result to each the processor, and generating a reset signal for resuming operation in synchronization of all the computing modules after executing the delay adjustment for making a state of instruction execution be coincident among the computing modules.

In another preferred construction, the re-synchronization program comprises the function of each of all the processors received the interruption to shift to a processor management mode for re-synchronization processing in which an instructions number counter for counting the number of executed instructions in the processor fails to operate;

the function of each the processor to compare the read instructions number counter value with an instructions number counter value received from each processor in other computing modules;

the function of the computing module, which does not include the instructions number counter indicating the largest value among all of the counters, to execute the delay adjustment of executing instructions until the instructions number counter value coincides with the largest instructions number counter value and when the values coincide, to send a notification to the computing module which includes the instructions number counter indicating the largest value, and the function of the computing module, which includes the instructions number counter indicating the largest value, to wait for receiving a notification from all the other computing modules and when receiving all the notifications, instruct on generation of the reset signal for causing all the computing modules to resume operation in synchronization.

In another preferred construction, the re-synchronization program comprises in the delay adjustment in which the computing module whose the instructions number counter value is not the largest executes instructions until the instructions number counter value coincides with the largest instructions number counter value;

the function of setting the processor at a step execution mode for shifting to the processor management mode after executing one instruction;

the function of the processor to repeat the processing of the step execution mode until the instructions number counter value coincides with the largest instructions number counter value.

In another preferred construction, the re-synchronization program comprises the function of each of all the processors received the interruption to shift to the processor management mode for re-synchronization processing in which an instructions number counter for counting the number of executed instructions in the processor fails to operate and a program counter value is saved and stored;

the function of each the processor to read the instructions number counter value of each processor and the saved program counter value and transmit the values to all other the computing modules;

the function of each the processor to compare the read instructions number counter value with an instructions number counter value received from each processor in other computing modules;

the function of the computing module whose the instructions number counter value is not the largest to execute the delay adjustment of executing instructions until the instructions number counter value coincides with the largest instructions number counter value and when the values coincide, to send a notification to the computing module which includes the instructions number counter indicating the largest value, and the function of the computing module which includes the instructions number counter indicating the largest value to wait for receiving a notification from all the other computing modules and when receiving all the notifications, instruct on generation of the reset signal for causing all the computing modules to resume operation in synchronization.

In another preferred construction, the re-synchronization program comprises in the delay adjustment in which the computing module whose the instructions number counter value is not the largest executes instructions until the instructions number counter value coincides with the largest instructions number counter value;

the function of setting the processor at a break point designation execution mode for shifting to the processor management mode after executing the processor up to an instruction at a specific position in a designated instruction string;

the function of, as the specific position in the instruction string, designating an instruction position indicated by the program counter value received from the computing module which includes the instructions number counter indicating the largest to, and the function of shifting the processor to the processor management mode after the processor executes the instruction string up to the specific position in a designated instruction string.

In another preferred construction, the re-synchronization program comprises the function of the computing module, which includes the instructions number counter indicating the largest, to wait for the notification from other computing modules after reading a program execution state, the function of all the other computing modules, which does not include the instructions number counter indicating the largest value, to read a program execution state and transmit the program execution state together with a notification of completion of the delay adjustment processing to the computing module which includes the instructions number counter indicating the largest after executing the delay adjustment processing, and the function of the computing module which includes the instructions number counter indicating the largest to compare program execution states of all the computing modules and when all coincide with each other, instruct on generation of the reset signal for resuming operation in synchronization and when a computing module whose program execution state is not coincident is detected, instruct on the generation of the reset signal for resuming operation in synchronization after executing processing of cutting off and invalidating the computing module.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a through understanding of the present invention. It will be obvious, however, to those skilled in the art that the present invention may be practiced without these specific details. In other instance, well-known structures are not shown in detail in order to unnecessary obscure the present invention.

Modes of implementation of the present invention will be described in detail with reference to the drawings in the following.

Figure 1:
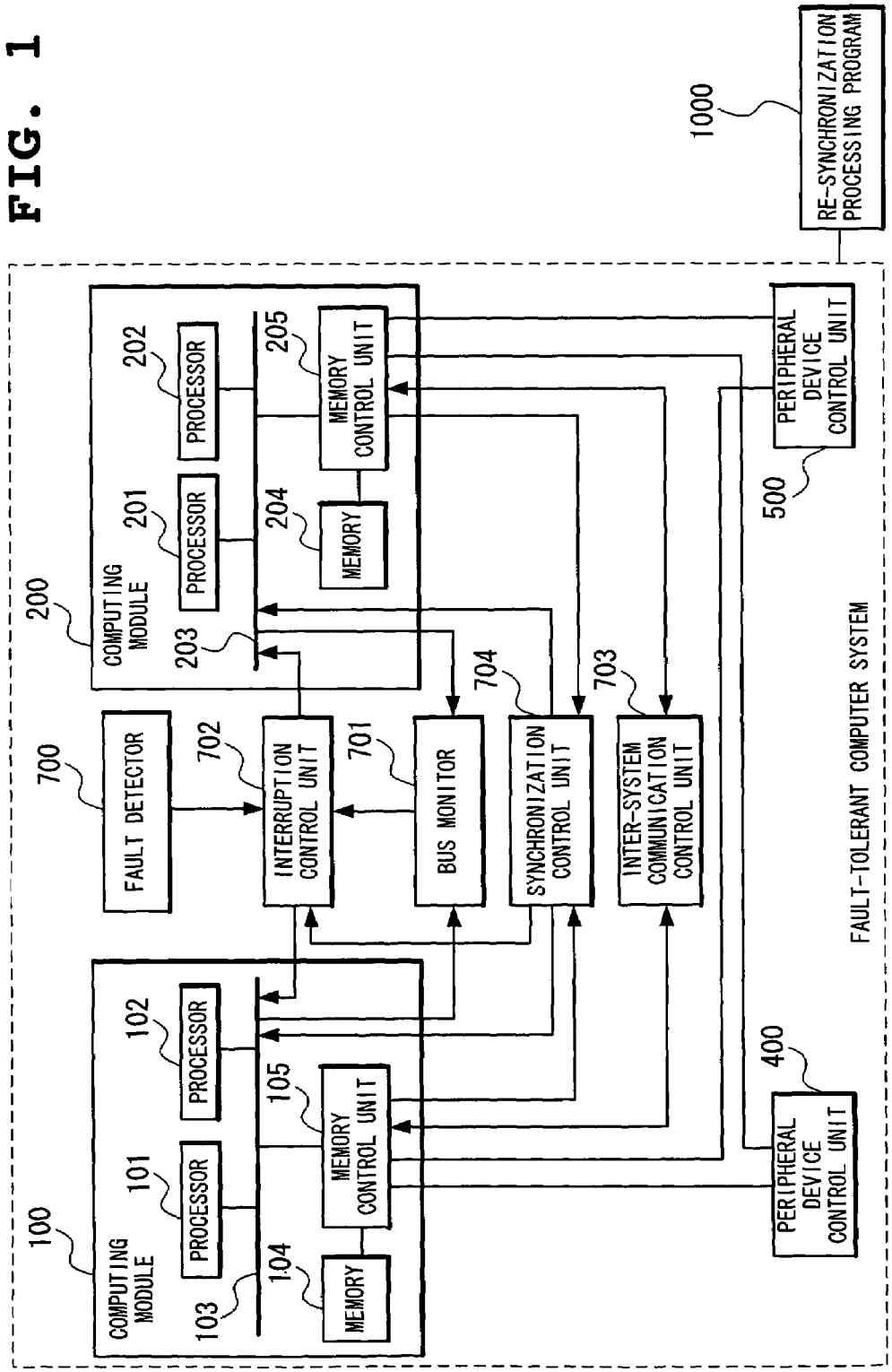
FIG. 1 is a block diagram showing a structure of a fault-tolerant computer system according to a first mode of implementation of the present invention.

Structure of a fault-tolerant computer system according to a first mode of implementation of the present invention is shown in FIG. 1. In FIG. 1, the fault-tolerant computer system includes a plurality of computing modules 100 and 200, each of which computing modules 100 and 200 processes the same instruction string in clock synchronization with each other. The fault-tolerant computer system compares a processing result of each computing module to enable. When one computing module develops a fault, the processing can be continued by the remaining computing module.

The computing modules includes a plurality of processors 101 and 102, a processor external bus 103, a memory 104 and memory control unit 105. The computing module 200 also includes the same components as the computing module 100.

In addition, the computing modules 100 and 200 are connected to peripheral device control units 400 and 500 for controlling a peripheral device through the memory control units 105 and 205.

The above-described fault-tolerant computer system further includes a fault detector 700, a bus monitor 701, an interruption control unit 702, an inter-system communication control unit 703, and a synchronization control unit 704.

The fault detector 700 monitors existence/non-existence of a fault in the entire system including the respective computing modules 100 and 200.

The bus monitor 701 monitors a state of access of the processor in each of the computing modules 100 and 200 to the external buses 103 and 203.

In a case where the bus monitor 701 detects disagreement in output of each processor in the respective computing modules 100 and 200 to the external bus, when the fault detector 700 detects no fault, the interruption control unit 702 generates an interruption to notify the effect to all the processors.

The inter-system communication control unit 703, which is connected to the respective computing modules 100 and 200, provides a communication path for checking a state of disagreement in operation by the processors in the respective computing modules 100 and 200.

The synchronization control unit 704, which is connected to the respective computing modules 100 and 200, generates a reset signal for controlling re-synchronization to all the computing modules 100 and 200 in response to an instruction from any of the processors.

Here, the number of processors included in each of the computing modules 100 and 200 is not limited to two as is shown in the present mode of implementation and each computing module may be mounted with one, or three or more processors.

In addition, the number of computing module is not limited to two as is shown in the present mode of implementation and three or more computing modules may be included to have the same effect as that of the present invention.

Next, operation of thus structured fault-tolerant computer system according to the first mode of implementation will be detailed with reference to FIGS. 1, 2 and 3.

The fault detector 700 monitors existence/non-existence of a fault in the entire fault-tolerant computer system including the respective computing modules 100 and 200 and the respective peripheral device control units 400 and 500 and notifies the interruption control unit 702 of the result.

The bus monitor 701 is connected to the external buses 103 and 203 of the processors of the respective computing modules 100 and 200. The bus monitor 701 compares a state of access (bus protocol) of the processors 101, 102, 201 and 202 to the external bus to monitor whether the respective processors 101, 102, 201 and 202 access the processor external buses 103 and 203 at the same timing in synchronization with each other or not. When detecting lack of coincidence in operation of the processors 101, 102, 201 and 202, the bus monitor 701 notifies the effect to the interruption control unit 702.

When notified of the detection of lack of synchronization in operation by the bus monitor 701, if the fault detector 700 detects no fault in the fault-tolerant computer system, the interruption control unit 702 generates an interruption in order to notify the effect to all the processors in each computing module.

The interruption control unit 702 also suppresses generation of a new interruption after the generation of an interruption until an instruction is given from the synchronization control unit 704. The suppression prevents recognizing lack of synchronization in operation of an access of the processors to the external bus, which is caused by re-synchronization processing for each computing module, as lack of synchronization in ordinary operation.

Each of the processors 101, 102, 201 and 202 having received the interruption from the interruption control unit 702 corrects deviation in operation (step-out) between the respective computing modules 100 and 200 by executing re-synchronization processing for recovering a state where the same instruction string is executed in clock synchronization with each other.

The relevant re-synchronization processing will be described with reference to the flow charts shown in FIGS. 2 and 3.

Upon receiving an interruption, each of the processors 101, 102, 201 and 202 shifts to a processor management mode for re-synchronization processing in which an instructions number counter for counting the number of instructions executed in the processor fails to operate (Step 201).

Then, each of the processors 101, 102, 201 and 202 reads a value of its own instructions number counter (Step 202) to transmit the read value of the instructions number counter to other computing module through the memory control units 105 and 205 and the inter-system communication control unit 703 (Step 203).

Each of the processors 101, 102, 201 and 202 also reads the value of the instructions number counter of the processor in other computing module transmitted from the other computing module through the inter-system communication control unit 703 and the memory control units 105 and 205 (Step 204). Each of the processors compares the same with the value of the instructions number counter of the corresponding processor in each of all the computing modules (Step 205).

Here, the computing module which includes a processor whose instructions number counter indicates the largest value among all of the counters (hereafter, it is called the computing module with the instructions number counter of the largest value), while other computing modules execute instructions equivalent to a delay as a result of comparison of the instructions number counter values, conducts processing of queuing the execution (Step 206). When the numbers of executed instructions in all the computing modules 100 and 200 coincide with each other, the computing module with the instructions number counter of the largest value instructs the synchronization control unit 704 through the memory control unit 105 or 205 to generate a reset instruction for re-synchronization processing to all the computing modules 100 and 200 (Step 207).

On the other hand, all the computing modules which does not include the instructions number counter indicating the largest value execute delay step adjustment processing of executing instructions until entering the same instruction string execution state as that of the computing module whose number of executed instructions (the instructions number counter value) is the largest (Step 208). Each of the computing modules, whose instructions number counter value is not the largest, notifies completion of the delay step adjustment processing to the computing module whose instructions number counter value is the largest (Step 209) and thereafter waits for a reset instruction for the re-synchronization processing (Step 210).

Upon receiving the instruction from the computing module with the instructions number counter indicating the largest value, the synchronization control unit 704 generates a reset signal for recovering the operation in synchronization simultaneously to all the computing modules 100 and 200. In addition, the unit 704 at the same time gives the interruption control unit 702 an instruction to allow generation of an interruption, thereby preparing for ordinary operation in synchronization to be resumed.

Figure 2:
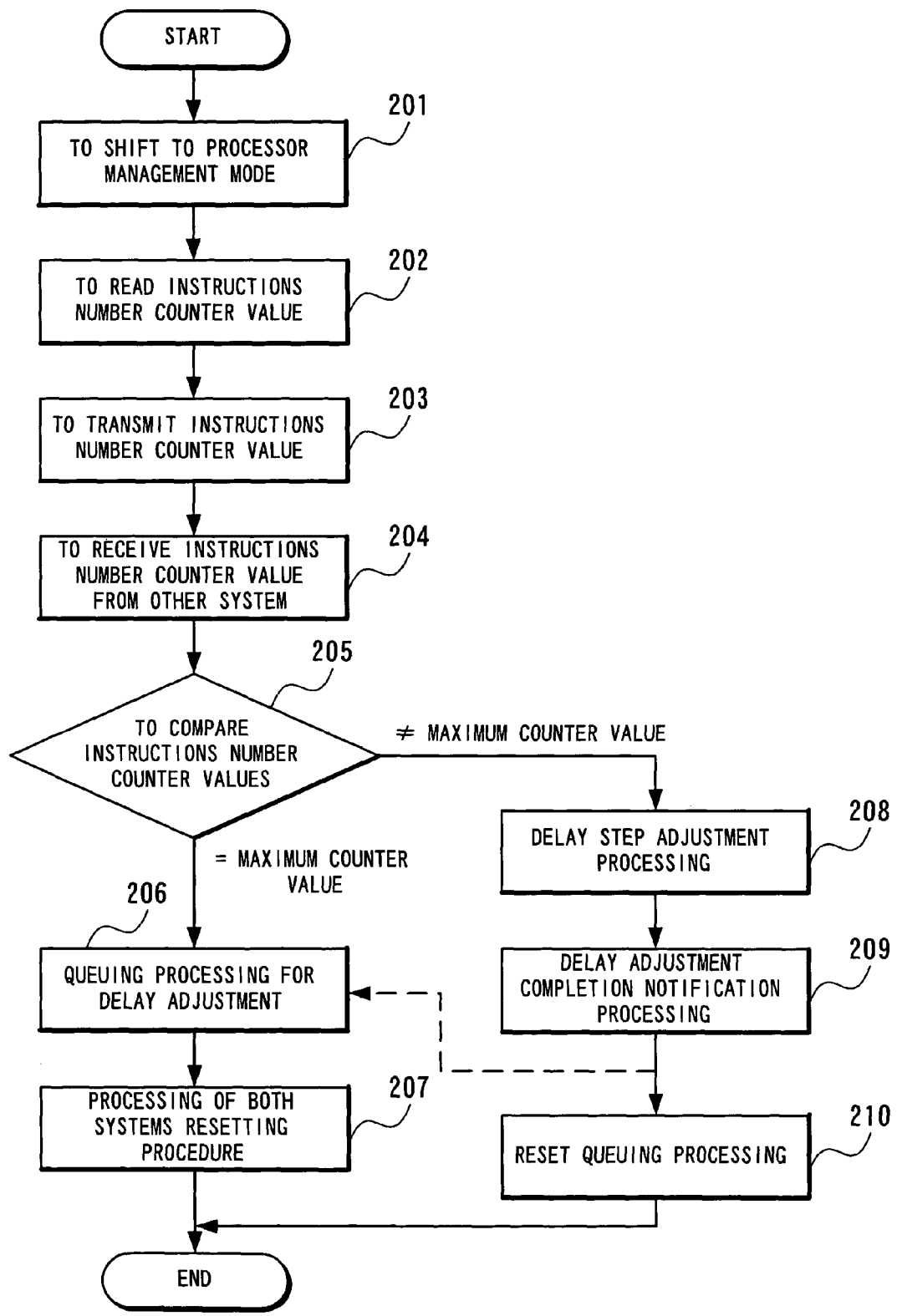
FIG. 2 is a flow chart for use in explaining first operation of the fault-tolerant computer system according to the first mode.
Figure 3:
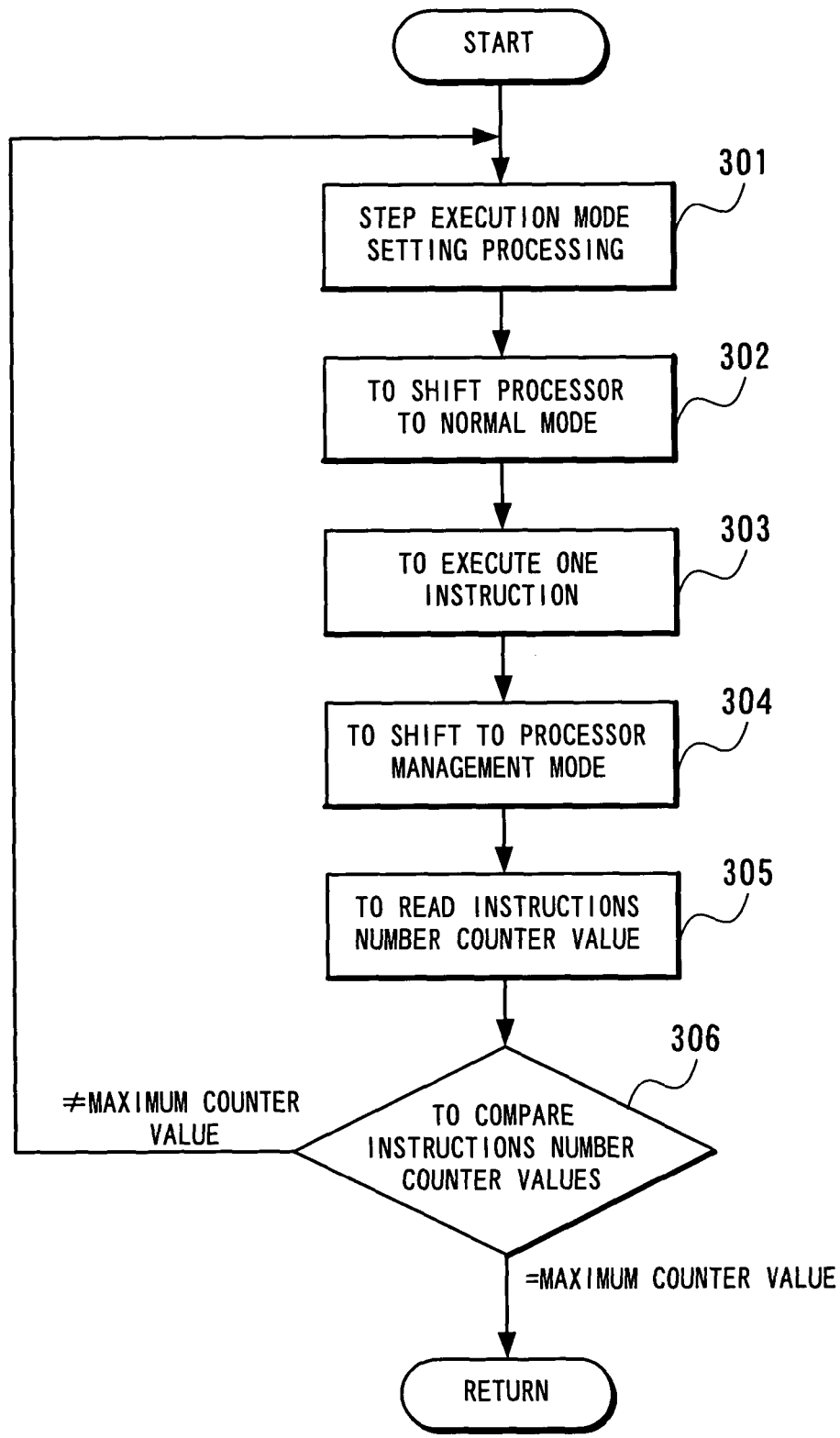
FIG. 3 is a flow chart for use in explaining the first operation of the fault-tolerant computer system.

FIG. 3 shows detailed function of the delay step adjustment processing illustrated in FIG. 2.

In the delay step adjustment processing (Step 208 in FIG. 2), the processors are set to a step execution mode in which the processors are shifted to the processor management mode just after executing one instruction (Step 301). Thereafter the processors are shifted to a normal execution mode (Step 302).

As a result, after executing only one instruction (Step 303), the processor shifts to the processor management mode (Step 304).

The processor reads the value of its own instructions number counter (Step 305), and compares the read value with the value of instructions number counter already received from the computing module with largest value (Step 306). When they fail to coincide with each other, the processor again repeats the processing of the step execution mode (Step 301) and when they coincide with each other, completes the delay step adjustment processing.

The foregoing described function enables a state of a computing module whose lock-step comes off due to other cause than a fixed failure to coincide with a state of other computing modules. In general, when lack of synchronization is detected first by monitoring the external buses, even at the step-out state, its degree of step-out is low enough to be restored to the state executing the same instruction string by executing above-described several steps of processing. Therefore, its processing time can be drastically reduced as compared with a conventional system in which all the memory regions are copied.

Figure 4:
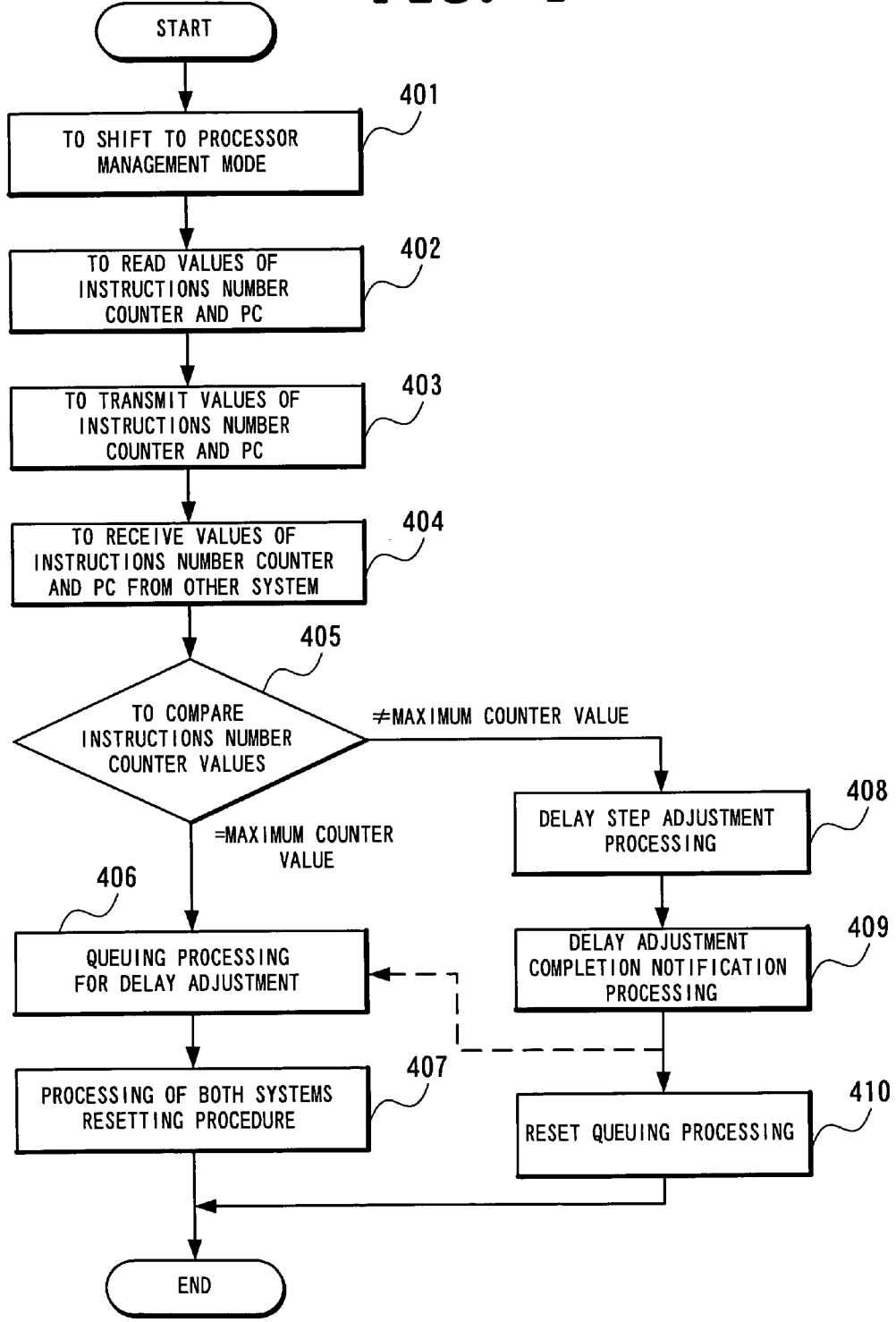
FIG. 4 is a flow chart for use in explaining second operation of the fault-tolerant computer system.
Figure 5:
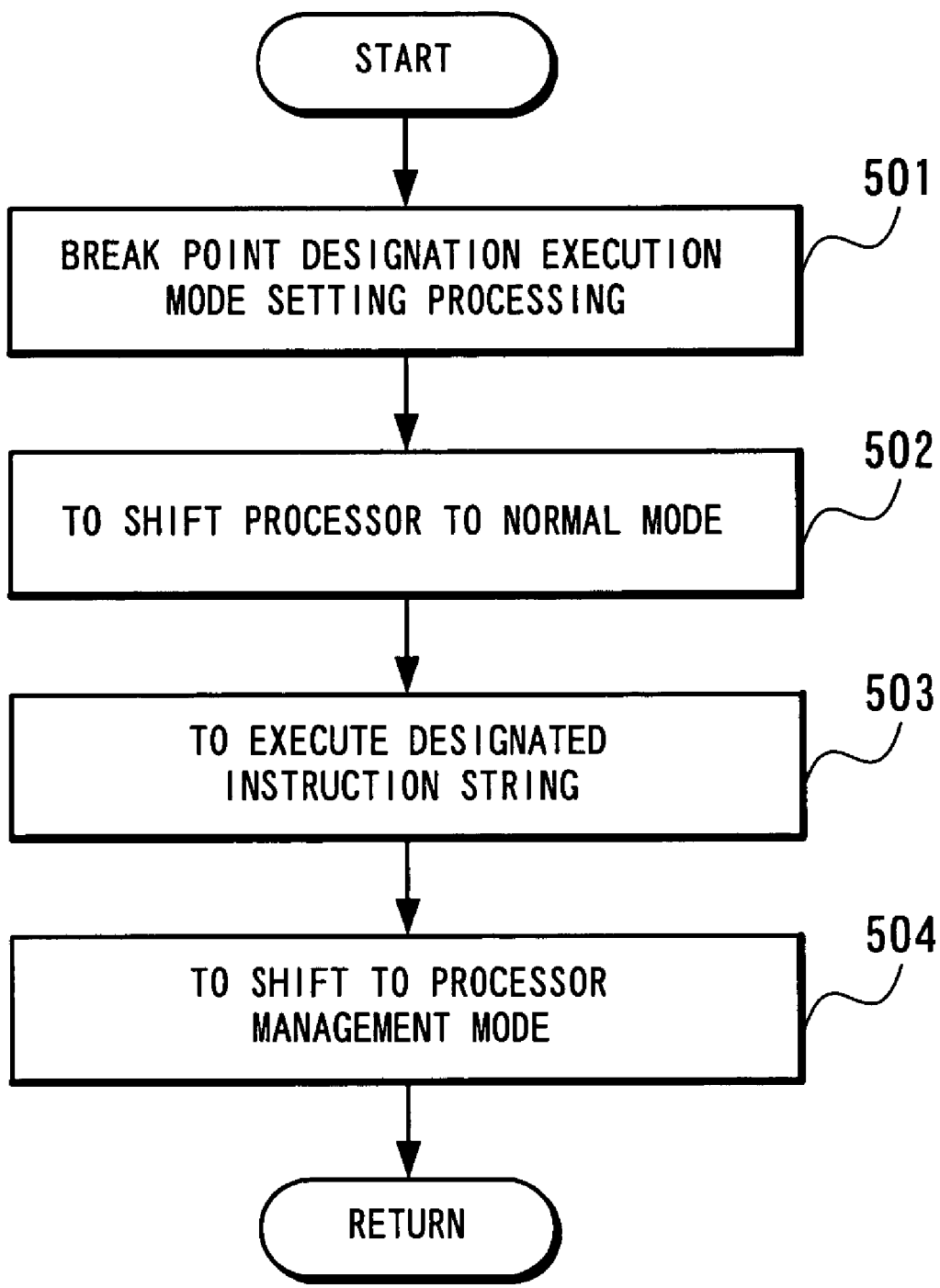
FIG. 5 is a flow chart for use in explaining the second operation of the fault-tolerant computer system.

FIGS. 4 and 5 are flow charts explaining second operation of the re-synchronization processing in the fault-tolerant computer system structured as shown in FIG. 1.

In this second operation, the processors 101, 102, 201 and 202 having received an interruption from the interruption control unit 702 each executes re-synchronization processing illustrated in FIG. 4 for correcting deviation in operation (step-out) among the respective computing modules 100 and 200 and for recovering the state where the same instruction string is executed in synchronization.

Upon receiving the interruption, each of the processors 101, 102, 201 and 202 shifts to the processor management mode for re-synchronization processing in which the instructions number counter in the processor for counting the number of executed instructions fails to operate and a value of the program counter (PC) in normal operation is saved and stored (Step 401).

Each of the processors 101, 102, 201 and 202 reads its own instructions number counter value and the saved value of the program counter (Step 402) and transmits the read values to other computing modules through the memory control units 105 and 205 and the inter-system communication control unit 703 (Step 403).

Each of the processors 101, 102, 201 and 202 also reads a value of the instructions number counter and a program counter value of the processor of other computing module which are transmitted from the other computing module through the inter-system communication control unit 703, and the memory control units 105 and 205 (Step 404). Each of the processors compares the value of its own instructions number counter with the value of the instructions number counter in the corresponding processor in each of all the computing modules (Step 405).

Here, the computing module which includes a processor whose instructions number counter indicates the largest value among all of the processors, while other computing modules execute instructions equivalent to a delay as a result of the comparison, conducts processing of queuing the execution (Step 406). When the numbers of executed instructions coincide in all the computing modules, the computing module with the instructions number counter of largest value instructs the synchronization control unit 704 through the memory control unit 105 or 205 to generate a reset instruction for re-synchronization processing to all the computing modules (Step 407).

On the other hand, all the computing modules whose instructions number counter value is not the largest execute the delay step adjustment processing of executing instructions until the same number of instructions are executed as that of the computing module with the instructions number counter indicating the largest value (Step 408). Each of the computing modules, where the instructions number counter of the largest value does not exist, notifies completion of the delay step adjustment processing to the computing module with the largest value (Step 409) and thereafter waits for a reset instruction for the re-synchronization processing (Step 410).

FIG. 5 shows details of the delay step adjustment processing in FIG. 4.

In the above-described delay step adjustment processing (Step 408 in FIG. 4), the processors are set to a break point designation execution mode which shifts a processor again to the processor management mode after instructions up to a specific position in a designated instruction string are executed. At this time, as the specific position of the instruction string, an instruction position indicated by a program counter value received from the computing module with the instructions number counter of the largest value (Step 501). Thereafter, the processors are shifted to the normal execution mode (Step 502).

As a result, after executing the instructions up to the specific position in the instruction string designated, that is, up to the same position in the instruction string as that in the computing module with the instructions number counter of the largest value (Step 503), the processor completes the delay step adjustment processing and again shifts to the processor management mode (Step 504).

Figure 6:
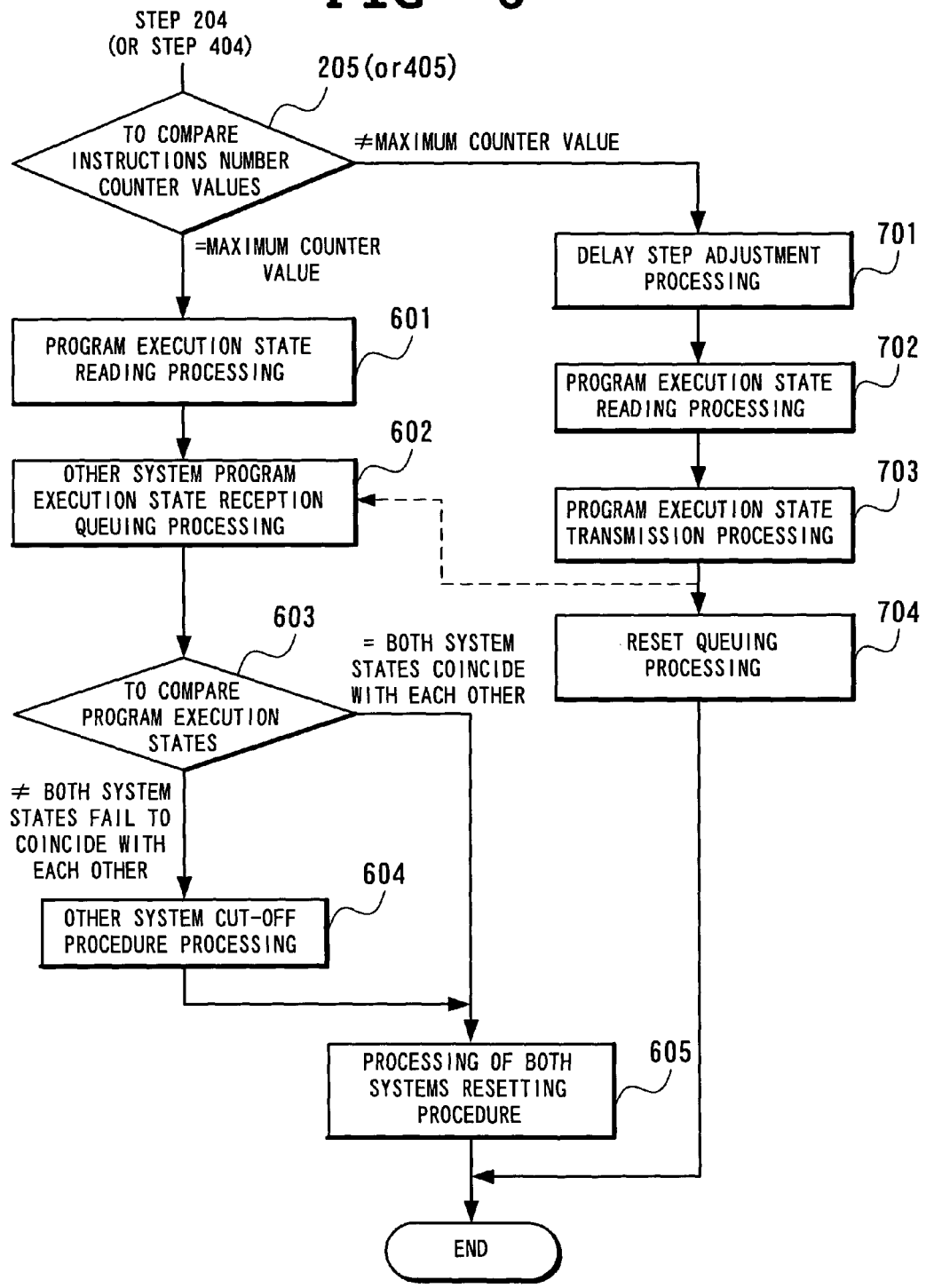
FIG. 6 is a flow chart for use in explaining third operation of the fault-tolerant computer system.

FIG. 6 is a flow chart explaining third operation of the fault-tolerant computer system according to the first mode of implementation, which in particular shows another example of processing following the instructions number counter comparison processing (Step 205 in FIG. 2 and Step 405 in FIG. 4) in the operation shown in FIGS. 2 and 4.

In the processing shown in FIG. 6, after reading a program execution state at the computing module with the instructions number counter of the largest value (Step 601), the computing module with largest value waits for a notification of delay step adjustment processing completion from other computing modules (Step 602).

On the other hand, after executing the delay step adjustment processing by any of the above-described methods or a similar method (Step 701), all the other computing modules whose instructions number counter value is not the largest each read its program execution state (Step 702). Each of the other computing modules transmits the program execution state to the computing module whose instructions number counter value is the largest together with the notification of the delay step adjustment processing completion (Step 703) and thereafter waits for a reset instruction for the re-synchronization processing (Step 704).

The computing module with the instructions number counter indicating the largest value which has received the program execution states compares program execution states of all the computing modules (Step 603). The computing module with the instructions number counter indicating the largest value executes synchronization operation resuming processing immediately in a case where the states all coincide. When detecting a computing module whose state fails to coincide, the computing module with the instructions number counter indicating the largest value executes the operation resuming processing of all the other computing modules (Step 605) after executing processing of cutting off only the computing module in question to invalidate the same (Step 604).

The processing contents shown in FIG. 6 enable even a lock-step synchronism fault-tolerant computer system adopting a processor which is not always reliable in step execution and break point execution to implement the present invention without having erroneous processing results.

Next, with reference to FIG. 7, description will be made of a fault-tolerant computer system according to a second mode of implementation of the present invention.

Figure 7:
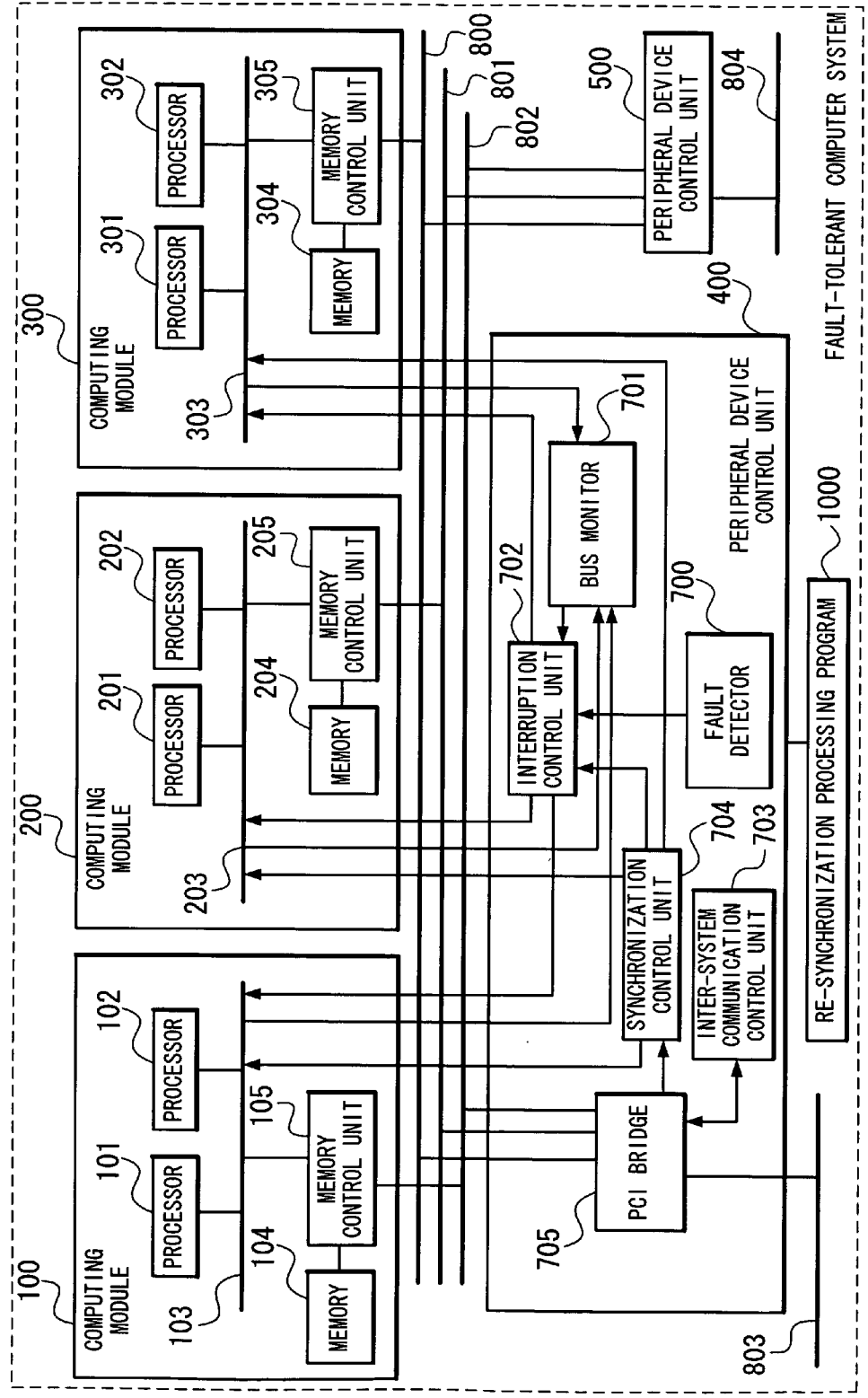
FIG. 7 is a block diagram showing a structure of a fault-tolerant computer system according to a second mode of implementation.

With reference to FIG. 7, the fault-tolerant computer system according to the present mode of implementation includes a plurality of computing modules 100, 200 and 300 each having a processor and a memory and a plurality of peripheral device control units 400 and 500 having mechanisms 803 and 804 for the connection with a peripheral device, respectively. Each of computing modules 100, 200 and 300 processes the same instruction string in synchronization with each other and compares a processing result of each computing module to enable. Even when one computing module develops a fault, the processing can be continued by the remaining computing modules.

In the fault-tolerant computer system according to the second mode of implementation, each of the peripheral device control units 400 and 500 includes a fault detector 700, a bus monitor 701, an interruption control unit 702, an inter-system communication control unit 703, and a synchronization control unit 704 which are shown in FIG. 1 and further includes a PCI bridge 705 for controlling connection among each computing module and each control unit in the peripheral device control unit and the peripheral device connection mechanisms 803 and 804.

Although not shown in the figure, the internal structure of the peripheral device control unit 500 is completely the same as that of the peripheral device control unit 400, and which control means in the peripheral device control unit 400 or the peripheral device control unit 500 is to be used can be arbitrarily determined by a program to run on the processor in the computing module, thereby enabling, even when the peripheral device control unit 400 or 500 related to re-synchronization develops a fault, availability to be enhanced by using the peripheral device control unit 400 or 500 having no failure.

The present mode of implementation achieves the effect of the present invention by the same operation as that of the above-described mode of implementation shown in FIG. 1 except that connection among the respective computing modules 100, 200 and 300 and the respective peripheral device control units 400 and 500 is established using the PCI bridge 705 as a representative peripheral device connection interface and that data transmission and reception to and from the inter-system communication control unit 703 and a reset processing instruction to the synchronization control unit 704 are executed by using the PCI protocol.

Figure 8:
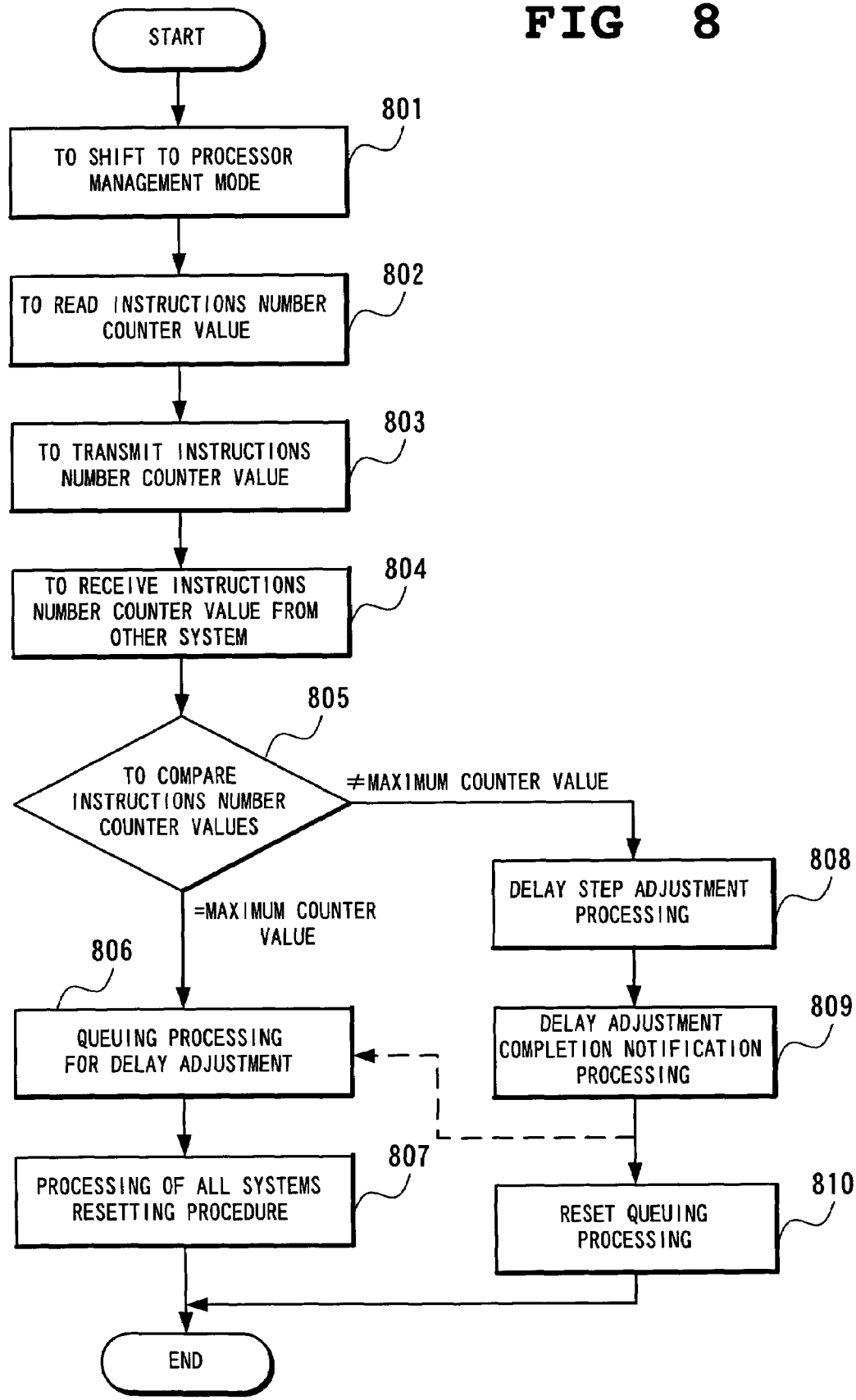
FIG. 8 is a flow chart for use in explaining operation of the fault-tolerant computer system according to the second mode.
Figure 9:
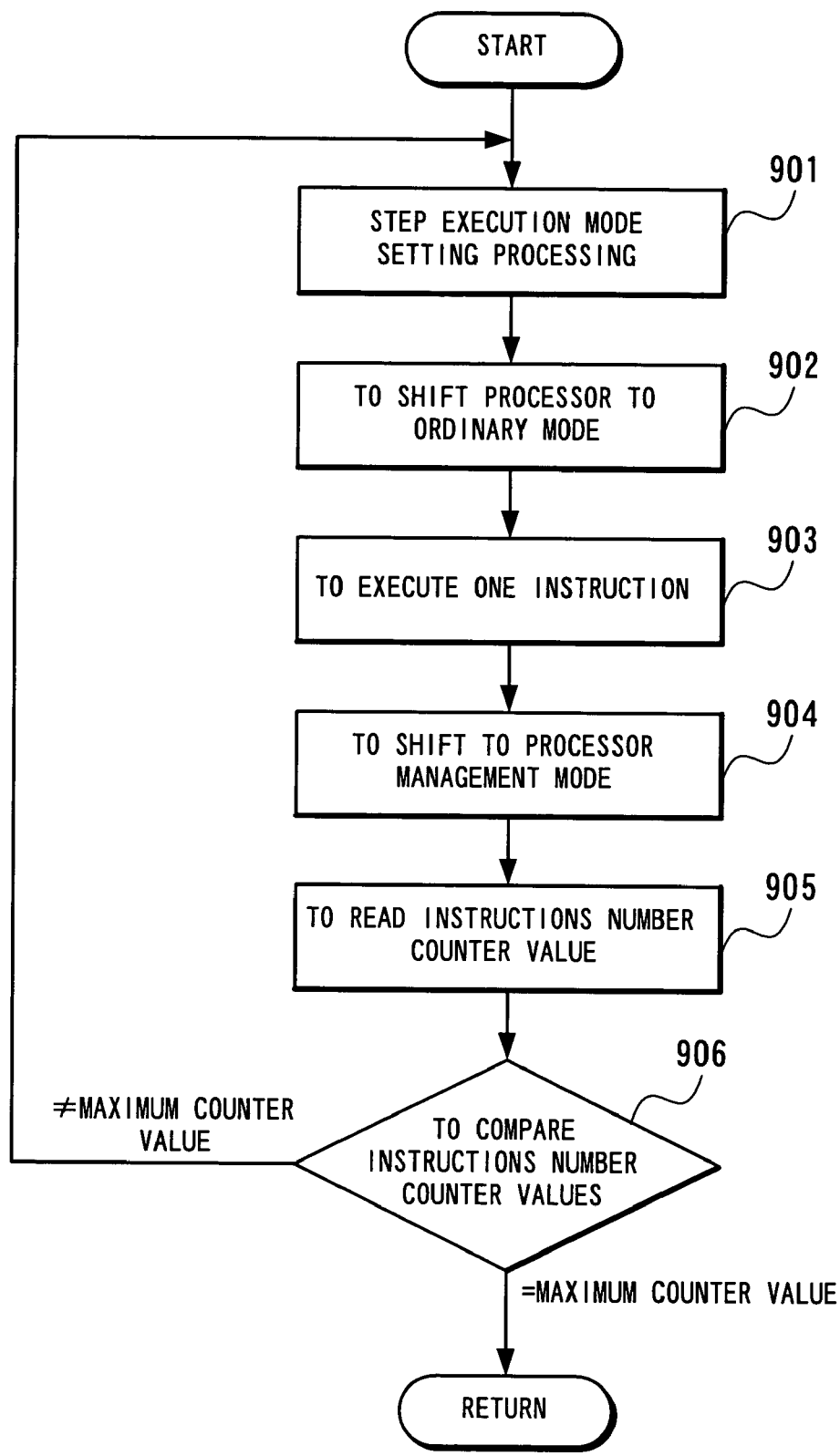
FIG. 9 is a flow chart for use in explaining the operation of the fault-tolerant computer system according to the second.

In addition, the present mode of implementation shows the structure where three computing modules are provided and detailed operation of re-synchronization processing with the structure is as illustrated in FIGS. 8 and 9. FIG. 8 shows a flow of operation generalized from the above-described operation in FIG. 2 in a case where a lock-step synchronism fault-tolerant computer system includes three or more computing modules. Contents of the processing are the same as those shown in FIGS. 2 and 3 except that the number of computing modules is different.

More specifically, in the flow charts shown in FIGS. 8 and 9, upon receiving an interruption, each processor shifts to the processor management mode for re-synchronization, a mode in which the instructions number counter for counting the number of instructions executed in the processor fails to operate (Step 801).

Then, each processor reads a value of its own instructions number counter (Step 802) and transmits the read value of the instructions number counter to other computing modules through the memory control units 105 and 205, the PCI bridge 705 and the inter-system communication control unit 703 (Step 803).

Each processor also reads the value of the instructions number counter of the processor in other computing module transmitted from the other computing module in question through the inter-system communication control unit 703, the PCI bridge 705 and the memory control units 105 and 205 (Step 804). Each processor compares the same with the value of the instructions number counter of the corresponding processor in each of all the computing modules (Step 805).

Here, the computing module which includes a processor whose instructions number counter indicates the largest value among all of the counters, while other computing modules execute instructions equivalent to a delay as a result of the comparison of the instructions number counter values, conducts processing of queuing the execution (Step 806). When the numbers of executed instructions in all the computing modules 100, 200 and 300 coincide with each other, the computing module with the instructions number counter of largest value instructs the synchronization control unit 704 to generate a reset instruction for re-synchronization processing to all the computing modules 100, 200 and 300 through the memory control unit 105 or 205 and the PCI bridge 705 (Step 807).

On the other hand, all the computing modules whose instructions number counter value is not the largest execute the delay step adjustment processing of executing instructions until entering the same instruction string execution state as that of the computing module with the instructions number counter indicating the largest value (Step 808). Each of the computing modules, where the instructions number counter of the largest value does not exist, notifies completion of the delay step adjustment processing to the computing module with the instructions number counter indicating the largest value (Step 809) and thereafter waits for a reset instruction for the re-synchronization processing (Step 810).

Upon receiving the instruction, the synchronization control unit 704 generates a reset signal for recovering the operation in synchronization simultaneously to all the computing modules 100, 200 and 300. In addition, the unit 704 at the same time gives the interruption control unit 702 an instruction to allow generation of an interruption when operation lacks synchronization, thereby preparing for normal operation in synchronization to be resumed.

FIG. 9 shows detailed function of the delay step adjustment processing illustrated in FIG. 8.

In the delay step adjustment processing (Step 808 in FIG. 8), the processors are set to a step execution mode in which the processors are shifted to the processor management mode just after executing one instruction (Step 901). Thereafter the processors are shifted to a normal execution mode (Step 902).

As a result, after executing only one instruction (Step 903), the processor shifts to the processor management mode (Step 904).

The processor reads the value of its own instructions number counter (Step 905), and compares the read value with the value of instructions number counter value already received from the computing module with the instructions number counter indicating the largest value (Step 906). When they fail to coincide with each other, the processor again repeats the processing of the step execution mode (Step 901) and when they coincide with each other, completes the delay step adjustment processing.

Figure 10:
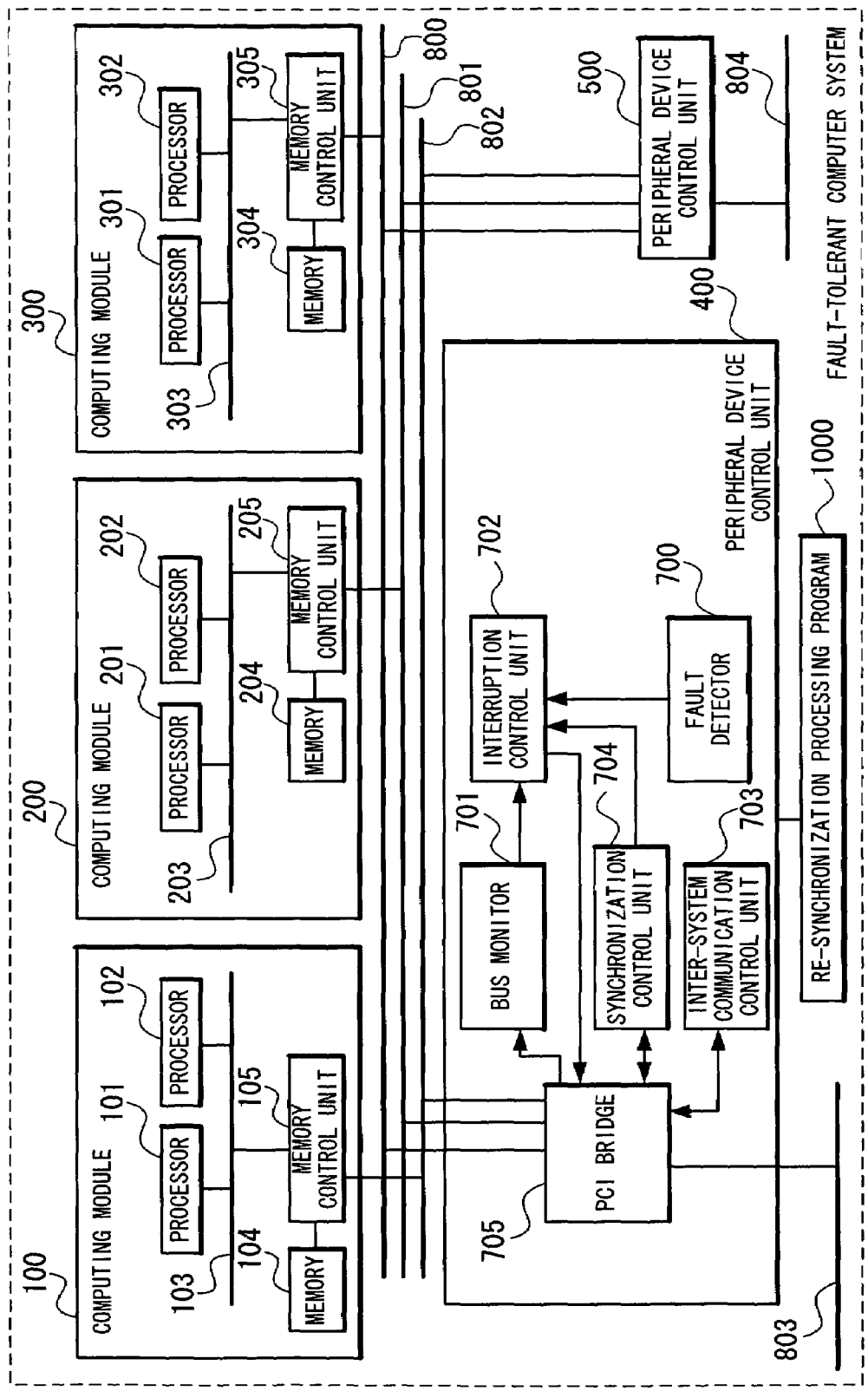
FIG. 10 is a block diagram showing a structure of a fault-tolerant computer system according to a third mode of implementation.

FIG. 10 shows a structure of a fault-tolerant computer system according to a third mode of implementation of the present invention. With reference to FIG. 10, the fault-tolerant computer system according to the present mode of implementation is the same as that of the second mode of implementation shown in FIG. 7 except that information transmission and reception to and from each computing module by the bus monitor 701 and the interruption control unit 702 is executed also through the PCI bridge 705, and obtains the same effect by the same operation shown in FIGS. 8 and 9.

In the fault-tolerant computer system of the present invention, the function of each unit which executes the re-synchronization processing can be realized not only by hardware but also by loading a re-synchronization processing program 1000 which executes the function of each of the above-described units into a memory of a computer processing device to control the computer processing device. The re-synchronization processing program 1000 is stored in a recording medium such as a magnetic disk or a semiconductor memory and loaded from the recording medium into the computer processing device to control operation of the computer processing device, thereby realizing each of the above-described functions.

Although the present invention has been described with respect to the preferred modes of implementation in the foregoing, the present invention is not necessarily limited to the above-described modes of implementation but realized in various forms within the scope of its technical idea.

Irrespectively whether the number of computing modules is two, or three or more, the present invention achieves completely the same effect by the foregoing described structure and operation.

In addition, no constraint is posed also on the number of processors in each computing module and structure in which one processor is provided and structure in which three or more processors are provided function in completely the same manner. Furthermore, although shown in each of the above-described modes of implementation is a case where the respective processors share one external bus and connected on the same bus, neither, for example, a structure in which a plurality of processors are connected in the form of asterism to a memory control unit nor a structure in which processors forming one computing module are physically divisionally formed on a plurality of boards affects the effects of the present invention.

Moreover, the present invention may include a pair of a computing module and respective units for re-synchronization such as a bus monitor or a plurality of pairs of these components. In addition, these components may be provided in a peripheral device control unit or may be formed on a dedicated board or the like. Alternatively, the computing module and other respective units for re-synchronization such as the bus monitor may be connected by a PCI or an interface means of other standard such as PCI-X, or by a dedicated interface means not standardized to obtain the same effect as that described above.

As described in the foregoing, the present invention attains the following effects.

First effect is enabling a certain computing module in a fault-tolerant computer system, when it comes off from the lock-step state due to other cause than a fixed failure, to be restored to the lock-step state in an extremely short period of time.

The reason is that at an initial stage of generation of step-out, when deviation in processing of each computing module is small, by generating an interruption to a processor and after adjusting a delay of a computing module whose processing has a delay to resume operation in synchronization, synchronization operation state can be restored without copying all the memory.

Second effect is improving availability of the fault-tolerant computer system. The reason is that a time period of halt of the entire system can be drastically reduced by significantly speeding up time of re-synchronization processing when lock-step comes off.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A lock-step synchronism fault-tolerant computer system including a plurality of computing modules having a processor and a memory in which each computing module processes the same instruction string in synchronization with each other, wherein
   when detecting disagreement in a state of access to an external bus among said processors in each said computing module, if no fault is detected in the system including each said computing module, processing of resuming operation in synchronization is executed with respect to each said computing module after generating an interruption to all of said processors to execute delay adjustment for making a state of instruction execution among said computing modules be coincident.

2. The fault-tolerant computer system as set forth in claim 1, further comprising:
   a fault detector which monitors existence/non-existence of a fault in the system;
   a bus monitor which monitors a state of access of each said processor in each said computing module to the external bus;
   interruption control means for, in a case where said bus monitor detects lack of synchronization in a state of access of each said processor in each said computing module to the external bus, when said fault detector detects no fault, generating an interruption for notifying the detection result to each said processor;
   inter-system communication control means connected to each said computing module for notifying a state of instruction execution among said processors in each said computing module, and
   synchronization control means connected to each said computing module for generating a reset signal for resuming operation of all said computing modules in synchronization after conducing delay adjustment for making a state of instruction execution in each said computing module be coincident.

3. The fault-tolerant computer system as set forth in claim 2, wherein
   each of all said processors includes an instructions number counter for counting the number of executed instructions in the processor, said instructions number counter fails to operate when said processors receive an interruption from said interruption control means and shift to a processor management mode for re-synchronization;
   each said processor compares a value of its own instructions number counter with a value of instructions number counter received from each corresponding processor in other computing modules;
   said computing module, which does not include the instructions number counter indicating the largest value among all of the counters, conducts delay adjustment of executing instructions until the instructions number counter value coincides with the largest instructions number counter value and when the values coincide, sends a notification to the computing module which includes the instructions number counter indicating the largest value, and
   said computing module, which includes the instructions number counter indicating the largest value, waits for receiving a notification from all the other computing modules and when receiving all the notifications, instructs said synchronization control means to generate a reset signal for causing all the computing modules to resume operation in synchronization with each other.

4. The fault-tolerant computer system as set forth in claim 3, wherein
   in delay adjustment in which said computing module whose said instructions number counter value is not the largest executes instructions until the instructions number counter value coincides with the largest instructions number counter value,
   said processor is set at a step execution mode for shifting to said processor management mode after executing one instruction, and
   said processor repeats the processing of the step execution mode until the instructions number counter value coincides with the largest instructions number counter value.

5. The fault-tolerant computer system as set forth in claim 2, wherein
   each of all said processors received an interruption from said interruption control means shifts to a processor management mode for re-synchronization processing in which an instructions number counter for counting the number of executed instructions in the processor fails to operate and a program counter value is saved and stored;
   each said processor reads an instructions number counter value of each processor and said saved program counter value and transmits the values to all other said computing modules;
   each said processor compares the instructions number counter value with an instructions number counter value received from each processor in other computing modules;
   said computing module whose said instructions number counter value is not the largest conducts delay adjustment of executing instructions until the instructions number counter value coincides with the largest instructions number counter value and when the values coincide, sends a notification to the computing module which includes the instructions number counter indicating the largest value, and said computing module which includes the instructions number counter indicating the largest value waits for receiving a notification from all the other computing modules receiving a notification from all the other computing modules and when receiving all the notifications, instructs said synchronization control means to generate a reset signal for causing all the computing modules to resume operation in synchronization with each other.

6. The fault-tolerant computer system as set forth in claim 5, wherein
in delay adjustment in which said computing module whose said instructions number counter value is not the largest executes instructions until the instructions number counter value coincides with the largest instructions number counter value, said processor is set at a break point designation execution mode for shifting to said processor management mode after executing up to an instruction at a specific position in a designated instruction string;

as said specific position in the instruction string, an instruction position indicated by the program counter value received from said computing module which includes the instructions number counter indicating the largest is designated to, and after executing the instruction string up to said specific position in a designated instruction string said processor is shifted to the processor management mode.

7. The fault-tolerant computer system as set forth in claim 3, wherein
after reading a program execution state, said computing module, which includes the instructions number counter indicating the largest, waits for said notification from other computing modules;

after executing the delay adjustment processing, all the other computing modules, which does not include the instructions number counter indicating the largest value, read a program execution state and transmit the program execution state together with a notification of completion of the delay adjustment processing to the computing module which includes the instructions number counter indicating the largest, and the computing module which includes the instructions number counter indicating the largest compares program execution states of all the computing modules and when all coincide with each other, instructs on generation of the reset signal for resuming synchronization operation and when a computing module whose program execution state is not coincident is detected, instructs on the generation of the reset signal for resuming operation in synchronization after executing processing of cutting off and invalidating the computing module.

8. The fault-tolerant computer system as set forth in claim 2, wherein
a plurality of pairs of said fault detector, said bus monitor, said interruption control means, said inter-system communication control means and said synchronization control means are provided.

9. A re-synchronization method in a lock-step system fault-tolerant computer system including a plurality of computing modules having a processor and a memory in which each computing module processes the same instruction string in synchronization with each other, comprising the steps of:
when detecting disagreement in a state of access to an external bus among said processors in each said computing module, if no fault is detected in the system including each said computing module, generating an interruption to all of said processors, and after executing delay adjustment for making an instruction execution state be coincident among said computing modules, executing processing of resuming operation in synchronization with respect to each said computing module.

10. The re-synchronization method of a fault-tolerant computer system as set forth in claim 9, further comprising the steps of:
monitoring existence/non-existence of a fault in the system;

monitoring a state of access of each said processor in each said computing module to the external bus;

when detecting disagreement in a state of access of each said processor in each said computing module to the external bus, if no fault is detected, generating an interruption for notifying the detection result to all of said processors, and after executing the delay adjustment for making a state of instruction execution be coincident among said computing modules, generating a reset signal for executing processing of resuming operation in synchronization of all said computing modules.

11. The re-synchronization method as set forth in claim 10, further comprising the steps of:
each of all said processors received said interruption shifting to a processor management mode for re-synchronization processing in which an instructions number counter for counting the number of executed instructions in the processor fails to operate;

each said processor comparing the read instructions number counter value with an instructions number counter value received from each processor in other computing modules;

said computing module, which does not include the instructions number counter indicating the largest value among all of the counters, executing the delay adjustment of executing instructions until the instructions number counter value coincides with the largest instructions number counter value and when the values coincide, sending a notification to the computing module which includes the instructions number counter indicating the largest value, and said computing module, which includes the instructions number counter indicating the largest value, waiting for receiving a notification from all the other computing modules and when receiving all the notifications, generating the reset signal for causing all the computing modules to resume operation in synchronization with each other.

12. The re-synchronization method as set forth in claim 11, wherein
in the delay adjustment in which said computing module whose said instructions number counter value is not the largest executes instructions until the instructions number counter value coincides with the largest instructions number counter value;

said processor is set at a step execution mode for shifting to said processor management mode after executing one instruction, and said processor repeats the processing of the step execution mode until the instructions number counter value coincides with the largest instructions number counter value.

13. The re-synchronization method as set forth in claim 10, wherein each of all said processors received said interruption shifts to a processor management mode for re-synchronization processing in which an instructions number counter for counting the number of executed instructions in the processor fails to operate and a program counter value is saved and stored;

each said processor reads the instructions number counter value of each processor and said saved program counter value and transmits the values to all other said computing modules;

each said processor compares the instructions number counter value with an instructions number counter value received from each processor in other computing modules;

said computing module whose said instructions number counter value is not the largest executes the delay adjustment of executing instructions until the instructions number counter value coincides with the largest instructions number counter value and when the values coincide, sends a notification to the computing module which includes the instructions number counter indicating the largest value, and said computing module which includes the instructions number counter indicating the largest value waits for receiving a notification from all the other computing modules and when receiving all the notifications, generates the reset signal for causing all the computing modules to resume operation in synchronization with each other.

14. The re-synchronization method as set forth in claim 13, wherein in delay adjustment in which said computing module whose said instructions number counter value is not the largest executes instructions until the instructions number counter value coincides with the largest instructions number counter value;

said processor is set at a break point designation execution mode for shifting to said processor management mode after executing up to an instruction at a specific position in a designated instruction string;

as said specific position in the instruction string, an instruction position indicated by the program counter value received from said computing module which includes the instructions number counter indicating the largest is designated to, and after executing the instruction string up to said specific position in a designated instruction string said processor is shifted to the processor management mode.

15. The re-synchronization method as set forth in claim 11, wherein after reading a program execution state, said computing module, which includes the instructions number counter indicating the largest, waits for said notification from other computing modules;

after executing the delay adjustment processing, all the other computing modules, which does not include the instructions number counter indicating the largest value, read a program execution state and transmit the program execution state together with a notification of completion of the delay adjustment processing to the computing module which includes the instructions number counter indicating the largest, and the computing module which includes the instructions number counter indicating the largest compares program execution states of all the computing modules and when all coincide with each other, instructs on generation of the reset signal for resuming synchronization operation and when a computing module whose program execution state is not coincident is detected, instructs on the generation of the reset signal for resuming operation in synchronization after executing processing of cutting off and invalidating the computing module.

16. A re-synchronization program stored on a recording medium for executing re-synchronization processing of a lock-step synchronism fault-tolerant computer system including a plurality of computing modules having a processor and a memory in which each computing module processes the same instruction string in clock synchronization with each other, comprising the functions of:

when detecting disagreement in a state of access to an external bus among said processors in each said computing module, if no fault is detected in the system including each said computing module, generating an interruption to all of said processors, and causing each said processor to resume operation in synchronization after executing delay adjustment for making an instruction execution state be coincident among said computing modules.

17. The re-synchronization stored on a recording medium program as set forth in claim 16, further comprising the functions of:

monitoring existence/non-existence of a fault in the system;

monitoring a state of access of each processor in each said computing module to the external bus, when detecting disagreement in a state of access of each said processor in each said computing module to the external bus, if no fault is detected in said fault monitoring, generating an interruption for notifying the detection result to each said processor, and generating a reset signal for resuming operation in synchronization of all said computing modules after executing the delay adjustment for making a state of instruction execution be coincident among said computing modules.

18. The re-synchronization stored on a recording medium program as set forth in claim 17, comprising:

the function of each of all said processors received said interruption to shift to a processor management mode for re-synchronization processing in which an instructions number counter for counting the number of executed instructions in the processor fails to operate;

the function of each said processor to compare the read instructions number counter value with an instructions number counter value received from each processor in other computing modules;

the function of said computing module, which does not include the instructions number counter indicating the largest value among all of the counters, to execute the delay adjustment of executing instructions until the instructions number counter value coincides with the largest instructions number counter value and when the values coincide, to send a notification to the computing module which includes the instructions number counter indicating the largest value, and the function of said computing module, which includes the instructions number counter indicating the largest value, to wait for receiving a notification from all the other computing modules and when receiving all the notifications, instruct on generation of the reset signal for causing all the computing modules to resume operation in synchronization.

19. The re-synchronization stored on a recording medium program as set forth in claim 18, comprising
in the delay adjustment in which said computing module whose said instructions number counter value is not the largest executes instructions until the instructions number counter value coincides with the largest instructions number counter value;
the function of setting said processor at a step execution mode for shifting to said processor management mode after executing one instruction;
the function of said processor to repeat the processing of the step execution mode until the instructions number counter value coincides with the largest instructions number counter value.

20. The re-synchronization stored on a recording medium program as set forth in claim 18, comprising:
the function of each of all said processors received said interruption to shift to the processor management mode for re-synchronization processing in which an instructions number counter for counting the number of executed instructions in the processor fails to operate and a program counter value is saved and stored;
the function of each said processor to read the instructions number counter value of each processor and said saved program counter value and transmit the values to all other said computing modules;
the function of each said processor to compare the read instructions number counter value with an instructions number counter value received from each processor in other computing modules;
the function of said computing module whose said instructions number counter value is not the largest to execute the delay adjustment of executing instructions until the instructions number counter value coincides with the largest instructions number counter value and when the values coincide, to send a notification to the computing module which includes the instructions number counter indicating the largest value, and
the function of said computing module which includes the instructions number counter indicating the largest value to wait for receiving a notification from all the other computing modules and when receiving all the notifications, instruct on generation of the reset signal for causing all the computing modules to resume operation in synchronization.

21. The re-synchronization stored on a recording medium program as set forth in claim 20, comprising
in the delay adjustment in which said computing module whose said instructions number counter value is not the largest executes instructions until the instructions number counter value coincides with the largest instructions number counter value;
the function of setting said processor at a break point designation execution mode for shifting to said processor management mode after executing said processor up to an instruction at a specific position in a designated instruction string;
the function of, as said specific position in the instruction string, designating an instruction position indicated by the program counter value received from said computing module which includes the instructions number counter indicating the largest to, and
the function of shifting said processor to the processor management mode after said processor executes the instruction string up to said specific position in a designated instruction string.

22. The re-synchronization stored on a recording medium program as set forth in claim 20, comprising:
the function of said computing module, which includes the instructions number counter indicating the largest, to wait for said notification from other computing modules after reading a program execution state,
the function of all the other computing modules, which does not include the instructions number counter indicating the largest value, to read a program execution state and transmit the program execution state together with a notification of completion of the delay adjustment processing to the computing module which includes the instructions number counter indicating the largest after executing the delay adjustment processing, and
the function of the computing module which includes the instructions number counter indicating the largest to compare program execution states of all the computing modules and when all coincide with each other, instruct on generation of the reset signal for resuming operation in synchronization and when a computing module whose program execution state is not coincident is detected, instruct on the generation of the reset signal for resuming operation in synchronization after executing processing of cutting off and invalidating the computing module.

* * * * *